July 20, 1926.
R. S. OHL
1,592,901
OSCILLATOR
Filed May 23, 1924
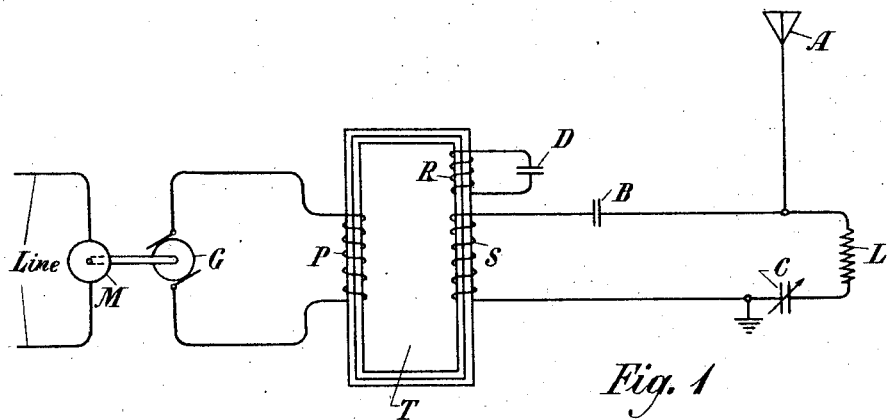
*Fig. 1*
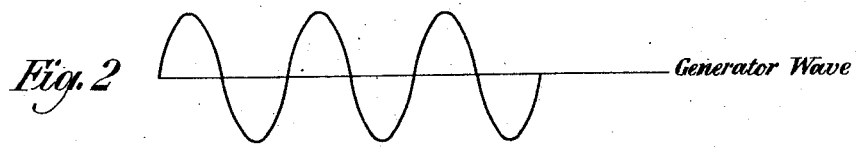
Generator Wave
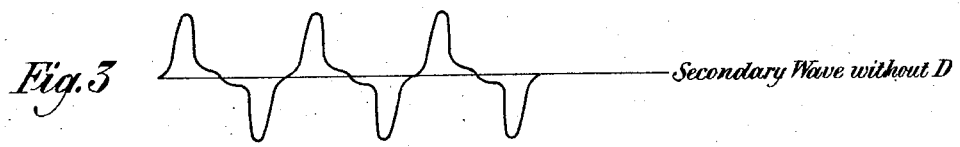
Secondary Wave without D
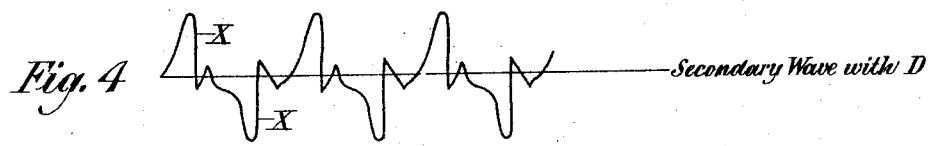
Secondary Wave with D
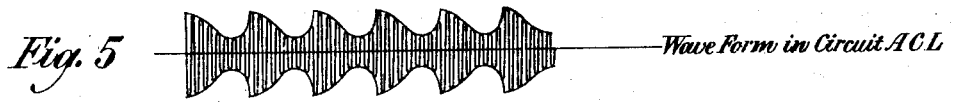
Wave Form in Circuit ACL
INVENTOR
Russell S. Ohl
BY
ATTORNEY Patented July 20, 1926.

1,592,901

UNITED STATES PATENT OFFICE.

RUSSELL S. OHL, OF NEW YORK, N. Y., ASSIGNOR TO AMERICAN TELEPHONE AND TELEGRAPH COMPANY, A CORPORATION OF NEW YORK.

OSCILLATOR.

Application filed May 23, 1924. Serial No. 715,437.

This invention relates to arrangements for producing high frequency oscillation such, for example, as oscillations suitable for radio or carrier purposes.

The essential features of the invention consist in associating with a generator of relatively low frequency oscillations of a transformer device arranged to produce harmonics of the original wave. There is also associated with the transformer device arrangements whereby a sharp cut-off characteristic will be produced in the wave form produced in the secondary winding of the transformer. The secondary winding of the transformer is coupled to a circuit tuned to any frequency which is a multiple of the original frequency generated. The sharp cut-off characteristic in the wave produced in the secondary winding of the transformer will produce shock excitation in the tuned circuit. This shock excitation will result in the production of a train of waves of relatively much higher frequency than the generated wave. Other features and details of the invention will appear more fully from the following description.

The invention may now be more fully understood from the following description, together with the accompanying drawing, in Figures 1, 2, 3, 4 and 5 of which the invention is illustrated. Fig. 1 shows a circuit diagram embodying the arrangements of the invention, while Figs. 2, 3, 4 and 5 show curves illustrating the various wave forms utilized in the invention.

In Fig. 1 is shown a line associated with a motor M. The motor M operates a generator G, which generates a sine wave such as is shown by the curve of Fig. 2. Associated with the generator is a transformer T having primary and secondary windings P and S respectively. A third winding R is shown on the core of the transformer. In series with the winding R is a condenser D. The transformer is arranged to produce harmonics of the original wave generated by G. The hysteresis effect of the transformer without the effect of the winding R would cause the wave produced in the secondary to be somewhat distorted. This form of wave is illustrated by the curve of Fig. 3. When the winding R and the feedback condenser D are associated with the transformer T, a sharp cut-off characteristic results in the voltage of the secondary winding. Accordingly, the wave form produced in the secondary winding will take the form shown by the curve of Fig. 4. It is pointed out that this curve has a sharp cut-off characteristic or drop such as is illustrated by X. The secondary winding S is loosely coupled through the condenser B to the circuit CL. The circuit CL includes the inductance and variable condenser C whereby it may be tuned to be resonant at frequencies which are multiples of the frequency generated by G. The sharp cut-off characteristic of the secondary wave from the transformer will produce a shock excitation on the circuit CL. This will result in the production of a train of oscillations which will take the form illustrated by the curve of Fig. 5. These trains of oscillations will be a multiple of the frequency of the wave originally generated by the generator G and will be of a much greater frequency. These high frequency waves may either be transmitted out over an antenna circuit A or over a carrier system, as desired.

While the invention has been disclosed in certain specific arrangements which are deemed desirable it is understood that it is capable of embodiment in many other and widely varied forms without departing from the spirit of the invention as defined in the appended claims.

What is claimed is:—

1. A circuit for generating high frequency oscillations comprising a generator of relatively low frequency oscillations, a harmonic producing transformer having primary and secondary windings, the primary winding of said transformer being connected to said generator, a circuit tuned to a frequency which is a multiple of said relatively low generated frequency, means for coupling the secondary winding of said transformer with said circuit, and means associated with said transformer for producing a sharp cut-off characteristic in the wave form produced in the secondary whereby shock excitation may result in said tuned circuit.

2. A circuit for generating high frequency oscillations comprising a generator of relatively low frequency oscillations, a harmonic producing transformer having primary and secondary windings, a circuit tuned to a frequency which is a multiple of said relatively low generated frequency, said primary winding of said transformer being associated with said generator and said secondary winding being coupled through a condenser to said tuned circuit, and a third winding on said transformer in series with a condenser for producing a sharp cut-off characteristic in the wave form produced in the secondary whereby shock excitation may result in said tuned circuit.

In testimony whereof, I have signed my name to this specification this 21st day of May, 1924.

RUSSELL S. OHL.